(12) United States Patent
Koong

(10) Patent No.: US 12,334,004 B2
(45) Date of Patent: Jun. 17, 2025

(54) DISPLAY STREAM COMPRESSION (DCS) WITH BUILT-IN HIGH PASS FILTER

(71) Applicant: Meta Platforms Technologies, LLC, Menlo Park, CA (US)

(72) Inventor: Semin Koong, Goyang-si (KR)

(73) Assignee: Meta Platforms Technologies, LLC, Menlo Park, CA (US)

(*) Notice: Subject to any disclaimer, the term of this patent is extended or adjusted under 35 U.S.C. 154(b) by 233 days.

(21) Appl. No.: 18/093,693

(22) Filed: Jan. 5, 2023

(65) Prior Publication Data

US 2024/0233629 A1 Jul. 11, 2024

(51) Int. Cl.
| | |
|---|---|
| G09G 3/3208 | (2016.01) |
| H04N 19/117 | (2014.01) |
| H04N 19/124 | (2014.01) |
| H04N 19/14 | (2014.01) |
| H04N 19/423 | (2014.01) |
| H04N 19/50 | (2014.01) |

(52) U.S. Cl.
CPC ......... *G09G 3/3208* (2013.01); *H04N 19/117* (2014.11); *H04N 19/14* (2014.11); *H04N 19/423* (2014.11); *G09G 2320/02* (2013.01); *G09G 2340/02* (2013.01); *G09G 2340/06* (2013.01); *H04N 19/124* (2014.11); *H04N 19/50* (2014.11)

(58) Field of Classification Search
CPC ............. G09G 3/3208; G09G 2320/02; G09G 2340/02; G09G 2340/06; H04N 19/117; H04N 19/14; H04N 19/124; H04N 19/50
USPC ...... 345/604; 375/240.19; 382/233; 348/297
See application file for complete search history.

(56) References Cited

U.S. PATENT DOCUMENTS

| | | | | |
|---|---|---|---|---|
| 5,787,210 A | * | 7/1998 | Kim | H04N 19/86 |
| | | | | 382/233 |
| 6,106,465 A | * | 8/2000 | Napolitano | G01S 7/52038 |
| | | | | 600/443 |
| 6,600,839 B2 | | 7/2003 | Mancuso et al. | |
| 7,764,848 B2 | | 7/2010 | Ida et al. | |
| 9,813,711 B2 | | 11/2017 | Macinnis et al. | |

(Continued)

OTHER PUBLICATIONS

Bae U., et al., "Fast Adaptive Unsharp Masking with Programmable Mediaprocessors," Journal of Digital Imaging, Jun. 1, 2003, vol. 16, No. 2, pp. 230-239.

(Continued)

*Primary Examiner* — Prabodh M Dharia
(74) *Attorney, Agent, or Firm* — Greenberg Traurig, LLP

(57) ABSTRACT

Sharpening of images in organic light emitting diode (OLED) displays through high pass filtering of edge data and use of additional line memory in display stream compression (DSC) part of a display driving integrated circuit (DDIC) is described herein. A system according to examples may locate edge points of line data by computing a difference between prediction data and filtered data, and adjust (e.g., add or subtract weights) the prediction data by comparing the computed difference with a predefined threshold. In some examples, a Sobel filter may be used with an additional line memory in the display stream compression (DSC) to obtain improved edge information. In other examples, the display stream compression (DSC)'s flatness check function may be used to identify and/or confirm edge data before adding or subtracting weights.

20 Claims, 12 Drawing Sheets

(56) References Cited

U.S. PATENT DOCUMENTS

| | | | |
|---|---|---|---|
| 10,631,005 B2 | 4/2020 | Jacobson et al. | |
| 11,102,493 B2 | 8/2021 | Glen et al. | |
| 2009/0141121 A1* | 6/2009 | Kimpe | H04N 13/327 |
| | | | 348/E13.001 |
| 2009/0316024 A1 | 12/2009 | Noh | |
| 2010/0054538 A1* | 3/2010 | Boon | G06T 7/246 |
| | | | 382/104 |
| 2010/0239173 A1 | 9/2010 | Yamada et al. | |
| 2013/0278578 A1* | 10/2013 | Vetsuypens | G09G 5/02 |
| | | | 345/207 |
| 2014/0294089 A1* | 10/2014 | MacInnis | H04N 19/63 |
| | | | 375/240.19 |
| 2015/0070544 A1* | 3/2015 | Smith | H01L 27/14621 |
| | | | 348/297 |
| 2017/0287384 A1* | 10/2017 | Lee | G09G 5/395 |
| 2020/0304805 A1* | 9/2020 | Li | H04N 19/80 |
| 2021/0109623 A1* | 4/2021 | Bae | G06F 3/0414 |
| 2022/0189389 A1 | 6/2022 | Lee et al. | |
| 2022/0303586 A1* | 9/2022 | Du | H04N 19/107 |

OTHER PUBLICATIONS

International Search Report and Written Opinion for International Application No. PCT/US2023/084884, mailed Mar. 28, 2024, 13 pages.

Russ J., "Image Enhancement in the Spatial Domain," The Image Processing Handbook, Jul. 4, 2011, pp. 269-336.

\* cited by examiner

DISPLAY STREAM COMPRESSION (DCS) WITH BUILT-IN HIGH PASS FILTER

TECHNICAL FIELD

This patent application relates generally to display systems, and more specifically, to display driving integrated circuits (DDICs) implementing a display stream compression (DSC) technique for image decompression.

BACKGROUND

With recent advances in technology, organic light emitting diode (OLED) based display systems, where an emissive electroluminescent layer is a film of organic compound that emits light in response to an electric current, have become common in devices such as television screens, computer monitors, and portable systems such as smartphones, VR devices, handheld game consoles, and smart watches. The organic layer is placed between two electrodes, at least one of which is transparent.

A display driving integrated circuit (DDIC) is one of the main control components of a display panel, also known as the "brain" of the display panel. The display driving integrated circuit (DDIC)'s main function is to send drive signals and data to the display panel in form of electrical signals, through the control of screen brightness and color, so that graphics, pictures, and other image information can be presented on the screen.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
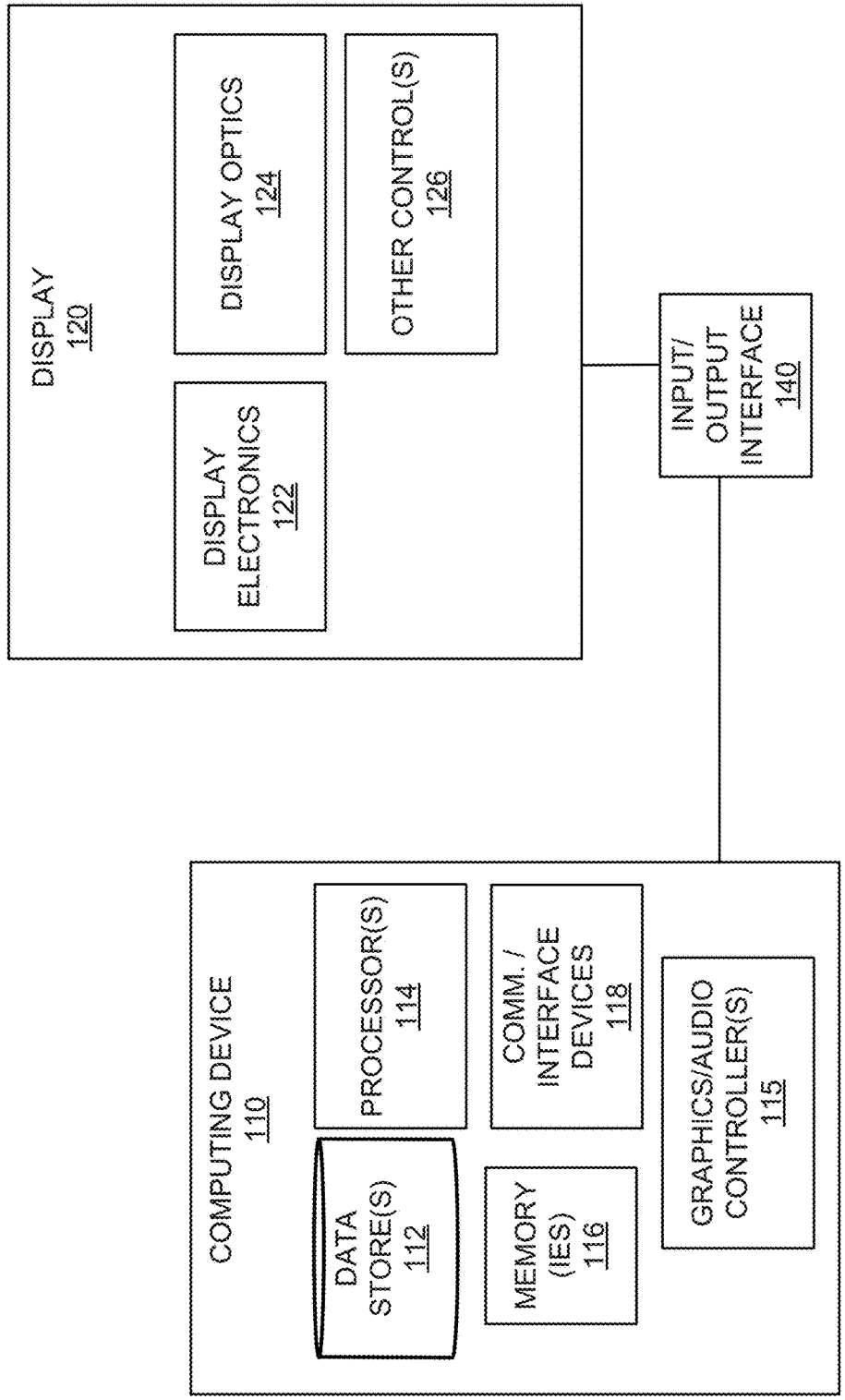
FIG. 1 illustrates a block diagram of a computing device with a display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

A display driving integrated circuit (DDIC) drives a display panel through electrical signals and transmits video data. A location of the display driving integrated circuit (DDIC) is differentiated according to passive matrix organic light emitting diode (PMOLED) or active matrix organic light emitting diode (AMOLED). In the case of passive matrix organic light emitting diode (PMOLED), display driving integrated circuit (DDIC) inputs current to both the horizontal and vertical ports of the panel, and the pixel dots light up under current excitation, and the brightness can be controlled by controlling the current level. In the case of active matrix organic light emitting diode (AMOLED), each pixel corresponds to a thin film transistor (TFT) layer and a data storage capacitor, which controls the gray level of each pixel achieving low power consumption and extended lifetime, and the display driving integrated circuit (DDIC) controls each pixel through the thin film transistor (TFT) layer. Each pixel is composed of multiple sub-pixels to represent the three primary red, green, blue (RGB) colors.

To enhance image quality, the display driving integrated circuit (DDIC) has the image processing logic on the receiver side. However, enhanced image processing requires additional memory. The display stream compression (DSC) decoder in the receiver has line memory to decode compressed video data. The display stream compression (DSC) exploits prediction mode (P-Mode) and index color history (ICH) mode. Prediction mode (P-Mode) needs line buffer (memory) to reconstruct pixels (decoding).

Disclosed herein are systems, apparatuses, and methods that may provide for sharpening of images in organic light emitting diode (OLED) displays through high pass filtering of edge data and use of additional line memory in the display stream compression (DSC) decoder part of a display driving integrated circuit (DDIC). A system according to examples may enhance an image employing a sharpening filter without additional memory in the display driving integrated circuit (DDIC). Edge points of line data may be determined by computing a difference between prediction data and filtered data, and adjusted (e.g., add or subtract weights) based on a predefined threshold. In other examples, an edge filter may be used to sharpen an image with additional memory (e.g., an additional line memory in the display stream compression (DSC) decoder. For example, a Sobel filter or a box filter such as a Roberts or Prewitt filter may be used with an additional line memory to obtain improved edge information. In further examples, the display stream compression (DSC)'s flatness check function may be used to identify edge data before adding or subtracting weights.

Example implementations may provide for image enhancement in organic light emitting diode (OLED) without an additional, separate memory circuit external or internal to the display driving integrated circuit (DDIC). By enhancing edge data, images may be sharpened without having to enhance all data. Thus, faster, less power consuming enhancement may be achieved with smaller, less complex circuitry. Other benefits and advantages may also be apparent.

Although examples described herein may be directed to specific displays, it should be appreciated that the systems, apparatuses, methods described herein may also apply to any digitally driven displays, including, but not limited to liquid crystal displays (LCDs), organic light emitting diode (OLED), microLED, liquid-crystal on Si (LCOS), or other similar displays. Furthermore, examples may be implemented in any digitally driven display application such as mobile devices, laptop computers, wearable devices, and similar ones.

FIG. 1 illustrates a block diagram of a system environment 100 that includes a computing device with a display, according to an example. As used herein, a "display" may refer to a device that presents content (e.g., video, still images, three-dimensional images, etc.). As used herein, "a display" may refer to display devices that use various display technologies and may be implemented in various shapes and forms. Such displays may include use of technologies associated with virtual reality (VR), augmented reality (AR), and/or mixed reality (MR). As used herein a "user" may refer to a user observing a display or wearer of a "wearable display."

As shown in FIG. 1, the system environment 100 may include a computing device 110, a display 120, and an input/output interface 140 coupled between the computing device 110 and the display 120 to enable communication and data exchange between the two. The computing device 110 may include a number of components and sub-systems such as data storage(s) 112, processor(s) 114, memory(ies) 116, communication/interface devices 118, and graphics/audio controller(s) 115, among others. The display 120 may include display electronics 122, display optics 124, and other control(s) 126, among other things. In some examples, part or all of the computing device 110 may be integrated with the display 120.

In some instances, the computing device 110 may be any device capable of providing content to the displayed to the display 120 including, but not limited to, a desktop computer, a laptop computer, a portable computer, a wearable computer, a smart television, a server, a game console, a communication device, a monitoring device, or comparable devices. The computing device 110 may execute one or more applications, some of which may be associated with providing content to be displayed to the display 120. The applications (and other software) may be stored in data storage(s) 112 and/or memory(ies) 116 and executed by processor(s) 114. Communication/interface devices 118 may be used to receive input from other devices and/or human beings, and to provide output (e.g., instructions, data) to other devices such as the display 120. Graphics/audio controller(s) 115 may be used to process visual and audio data to be provided to output devices. For example, video or still images may be processed and provided to the display 120 through the graphics/audio controller(s) 115.

In some examples, the data store(s) 112 (and/or the memory(ies) 116) may include a non-transitory computer-readable storage medium storing instructions executable by the processor(s) 114. The processor(s) 114 may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the computing device 110 described in conjunction with FIG. 1 may be encoded as instructions in the non-transitory computer-readable storage medium that, when executed by the processor, may cause the processor to perform the functions further described below.

In some examples, the data storage(s) 112 may store one or more applications for execution by the computing device 110. An application may include a group of instructions that, when executed by a processor, generates content for presentation to the user. Examples of the applications may include gaming applications, conferencing applications, video playback application, or other suitable applications.

In some examples, the display 120 may be used to display content provided by the computing device 110 and may take many different shapes or forms. For example, the display 120 may be a desktop monitor, a wall-mount monitor, a portable monitor, a wearable monitor (e.g., VR or AR glasses), and comparable ones to name a few. The display 120 may include display electronics 122, display optics 124, and other control(s) 126.

In some examples, the display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the display 120 may be implemented in any suitable form-factor as mentioned above, including a head-mounted display, a pair of glasses, or other similar wearable eyewear or device. Examples of the display 120 are further described below with respect to FIG. 2. Additionally, in some examples, the functionality described herein may be used in a head-mounted display or headset that may combine images of an environment external to the display 120 and artificial reality content (e.g., computer-generated images). Therefore, in some examples, the display 120 may augment images of a physical, real-world environment external to the display 120 with generated and/or overlaid digital content (e.g., images, video, sound, etc.) to present an augmented reality to a user.

In some examples, the display electronics 122 may display or facilitate the display of images to the user according to data received from, for example, the computing device 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display electronics 122 may include circuitry to provide power to the pixels, control behavior of the pixels, etc. Control circuitry, also referred to as "drivers" or "driving circuitry", may control which pixels are activated, a desired gray level for each pixel in some examples.

In some examples, the display optics 124 may display image content optically (e.g., using optical waveguides and/or couplers) or magnify image light received from the display electronics 122, correct optical errors associated with the image light, and/or present the corrected image light to a user of the display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an antireflective coating, a reflective coating, a filtering coating, and/or a combination of different optical coatings.

In some examples, the display 120 may include additional modules and/or functionality such as audio output, image capture, location/position sensing. Other control(s) 126 may be employed to control such functionality (e.g., level and/or quality of audio output, image capture, location/position sensing, etc.), as well as functionality of the display 120 such as wireless remote control of the display 120.

In some examples, the display 120 may be an OLED, LCOS, or microLED type display and include a layer of organic materials situated between two electrodes, all deposited on a substrate. Varying conductivity levels of the organic molecules may be taken advantage of by applying different voltages to the electrodes and emitting light to project images. Thus, the display electronics 122 may include driving circuitry for each of the pixels.

In some examples, the computing device 110 may provide content to the display 120 for presentation to the user through the input/output interface 140. The input/output interface 140 may facilitate data exchange between the computing device 110 and the display 120 through wired or wireless means (e.g., through radio frequency waves or optical waves) and include circuitry/devices to process exchanged data. For example, the input/output interface 140 may condition, transform, amplify, or filter signals exchanged between the computing device 110 and the display 120. The computing device 110 and/or the display 120 may include different or additional modules than those described in conjunction with FIG. 1. Functions further described herein may be distributed among components of the computing device 110 and the display 120 in a different manner than is described here.

Figure 2:
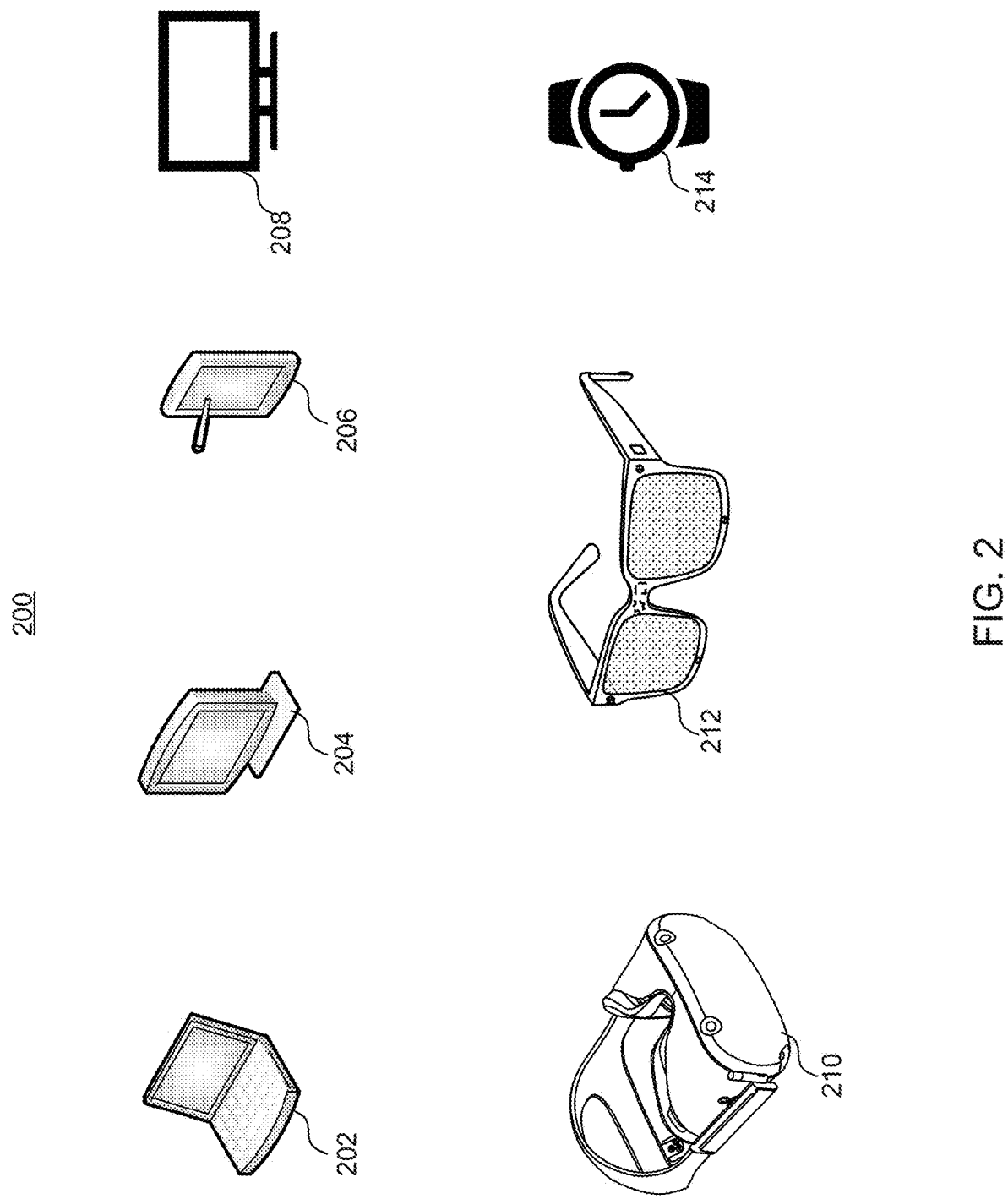
FIG. 2 illustrates various display devices, according to an example.

FIG. 2 illustrates various display devices in diagram 200, according to an example. In some examples, the display 120 of FIG. 1 may be integrated with or communicatively coupled to a device such as laptop computer 202, desktop monitor 204, portable computer 206 (e.g., a tablet), wall-mount display 208, head-mount display 210, glasses 212, or smart watch 214.

In some examples, the display may be a part of a VR system, an augmented reality (AR) system, a mixed reality (MR) system, another system that uses displays or wearables, or any combination thereof.

Figure 3:
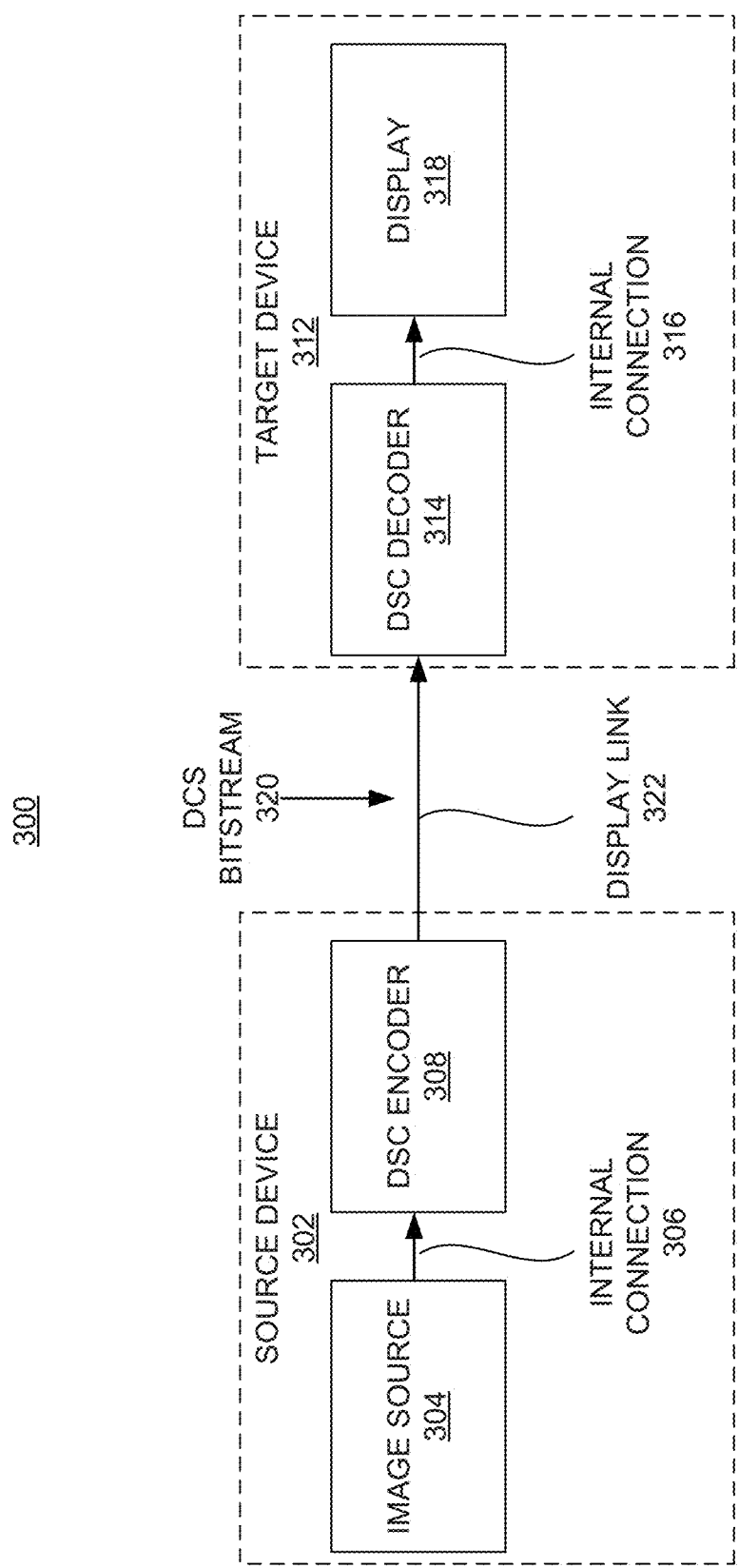
FIG. 3 is a block diagram of an end-to-end system employing a display stream compression (DSC) technique, according to an example.

FIG. 3 is a block diagram of an end-to-end system employing a display stream compression (DSC) technique, according to an example. Diagram 300 shows a source device 302 to transmit display data, which may include an image source 304 and a display stream compression (DSC) encoder 308 with an internal connection 306 between the two. Display data may be sent from the source device 302 to a target device 312 via a display link 322 as display stream compression (DSC) bitstream 320. The target device 312 (e.g., one of the devices in FIG. 2) may include a display stream compression (DSC) decoder 314 and a display 318 with an internal connection 316 between the two.

In some examples, uncompressed video data may enter the display stream compression (DSC) encoder 308 in real-time, in raster scan order. The display stream compression (DSC) encoder 308 may compress incoming pixels to form a bitstream, then temporarily store portions of the bitstream in its rate buffer. The rate buffer's output may be the picture layer of the display stream compression (DSC) bitstream 320 (i.e., everything except the picture parameter set (PPS)). The display stream compression (DSC) encoder 308 display stream compression (DSC) bitstream 320 may be conveyed in real-time from the display stream compression (DSC) encoder 308 to the display stream compression (DSC) decoder 314, by way of a transport layer of the display link 322.

The display stream compression (DSC) decoder 314 may receive the display stream compression (DSC) bitstream 320 into its rate buffer, which may temporarily store portions of the bitstream. The display stream compression (DSC) decoder 314 may decode bits from the rate buffer and then form uncompressed pixels, which may be output in real-time and raster scan order and sent to the display 318. The image output from the decoding process may have the same format as the image input to the encoding process in an end-to-end system.

Figure 4:
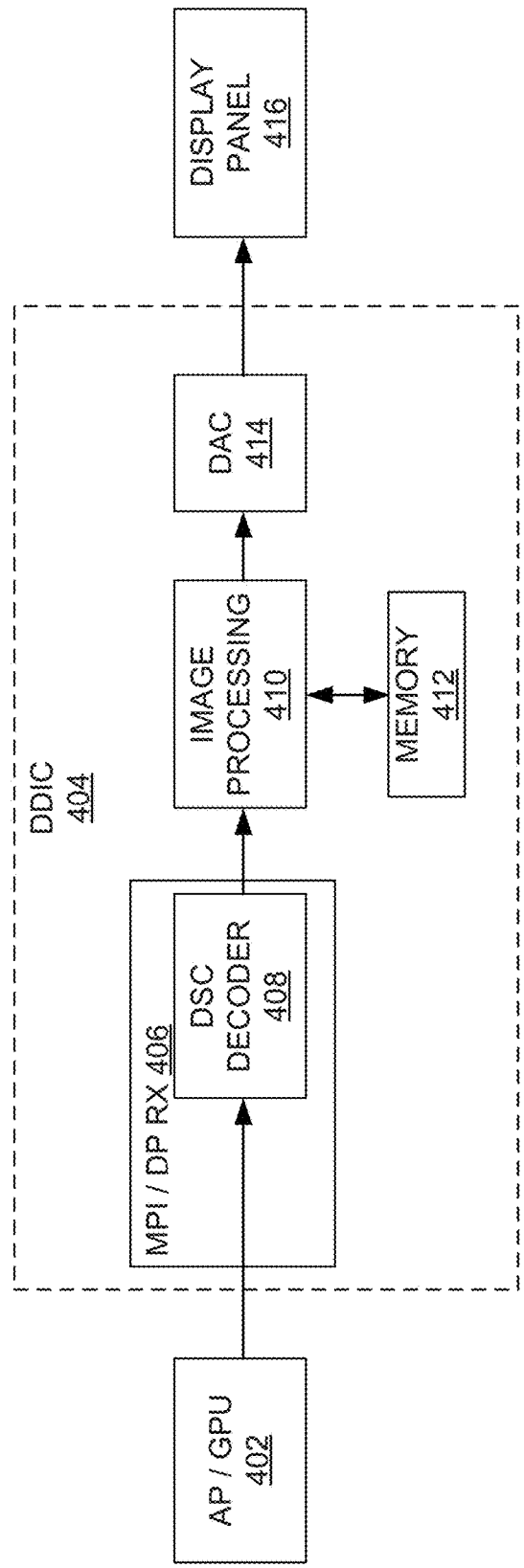
FIG. 4 illustrates a display driving integrated circuit (DDIC) with its main functional blocks in connection with a processor and a display panel, according to an example.

FIG. 4 illustrates a display driving integrated circuit (DDIC) with its main functional blocks in connection with a processor and a display panel, according to an example. Diagram 400 shows a display driving integrated circuit (DDIC) 404 with a mobile industry processor interface (MIPI) or display port receive interface 406, which may include a display stream compression (DSC) decoder 408. The display driving integrated circuit (DDIC) 404 may receive its input (bitstream) from an accelerated processing unit (APU) or graphical processing unit (GPU) 402. The display stream compression (DSC) decoder 408 may provide decoded data to an image processing block 410, which may enhance the image(s) from the bitstream storing at least some of the data temporarily in memory 412. A digital-analog-converted (DAC) 414 may receive the processed images and provide to display panel 416.

Thus, to enhance image quality, the display driving integrated circuit (DDIC) 404 may need the image processing block 406 following the receiver with additional memory (memory 412). However, the display stream compression (DSC) decoder 408 already includes line memory to decode compressed video data. Some example implementations may utilize (reuse) the processing and memory resources of the display driving integrated circuit (DDIC) 404 allowing enhancement of images without increasing (or reducing) display driving integrated circuit (DDIC) memory size and chip area.

Figure 5A:
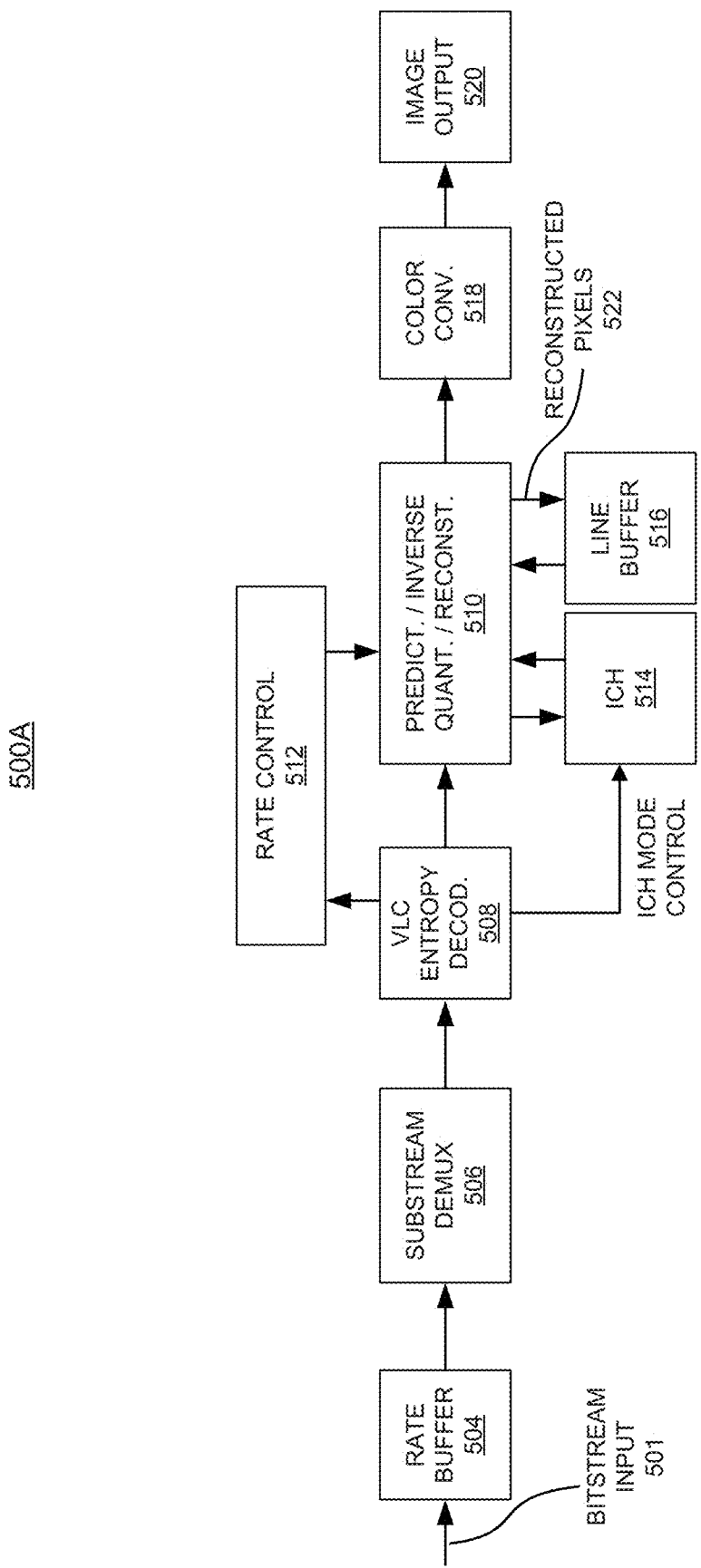
FIG. 5A illustrates a block diagram of a display stream compression (DSC) decoding process, according to an example.

FIG. 5A illustrates a block diagram of a display stream compression (DSC) decoding process, according to an example. Diagram 500A shows bitstream input 501 being received at a rate buffer 504, demultiplexed at substream demultiplexing 506, and decoded at variable length coding entropy decoder 508 followed by prediction, inverse quantization, and reconstruction 510 and color space conversion 518 providing image output 520. Rate control 512 may control prediction, inverse quantization, and reconstruction block 510 based on input from variable length coding entropy decoder 508. The variable length coding entropy decoder 508 may also provide index color history mode control to index color history module 514. Reconstructed pixels 522 from the prediction, inverse quantization, and reconstruction 510 may be stored in line buffer 516.

In some examples, the bitstream input 501 may include multiple layers. A lowest layer may be the substream layer, and there may be three or four substreams within each slice, one for each component. The three or four substreams may be multiplexed together by the encoding process to form a coded slice. If there is more than one slice per line, the coded slices may be multiplexed by the slice multiplexing process. The resulting bits of all slices may be concatenated to form a coded picture. Each coded picture may be preceded by a picture parameter set (PPS). In decoding the encoded bitstream, the substreams may be demultiplexed at the substream demultiplexing 506 and decoded at variable length coding entropy decoder 508 using delta size unit-variable length coding (DSU-VLC).

A number of sample value prediction techniques may be employed, for example, modified median-adaptive prediction (MMAP), block prediction (BP), and midpoint prediction (MPP) at the prediction, inverse quantization, and reconstruction block 510. Inverse quantization of residual values and reconstruction of sample values may also be performed at the prediction, inverse quantization, and reconstruction block 510.

As mentioned herein, the display stream compression (DSC) employs prediction mode (P-Mode) and index color history (ICH) mode. If the encoder only uses prediction mode (P-Mode) and modified median-adaptive prediction (MMAP) to compress pixel data, the display stream compression (DSC) memory may be used to provide a built-in high pass filter without additional memories. Thus, the memory resource of the display driving integrated circuit (DDIC) may be reused and the size of memory and display driving integrated circuit (DDIC) chip area may be reduced.

In many types of content, such as computer-generated text and graphics, similar pixel values may appear in reasonably close proximity while not necessarily being adjacent to one another. Because of this property, recently used pixel values may be tracked in an indexed color history (ICH). The encoder may send index values corresponding to selected pixel values of a particular pixel group within the indexed color history (ICH). These pixel values may then be used directly in the decoder's output pixel stream. However, example line memory based high pass filter implementations in image enhancement may rely on prediction mode (P-Mode) because the display stream compression (DSC) already utilizes a line memory in prediction mode (P-Mode).

The encoder and decoder may employ identically configured rate control (RC) algorithms. Decisions made by the rate control 512 to adjust quantization parameters (QPs) in the encoder may be mimicked in the decoder, such that the decoder has the same quantization parameter (QP) value as the encoder at every pixel. The quantization parameter (QP) value may be communicated to the decoder for the flatness indication only. Rate control decisions may be made in the encoder and decoder based on previously transmitted and received information, respectively.

In some examples, red-green-blue (RGB) video input to the encoding process may be converted to Y (luminance), Co (Chrominance Orange), Cg Chrominance Green (YCoCg). A reversible form of YCoCg, YCoCg-R may be used and converted back to red-green-blue (RGB) at the color space conversion 518. The inverse color space conversion may be performed at the end of the decoding process.

Returning to prediction, inverse quantization, and reconstruction, the encoder and decoder may automatically select modified median-adaptive prediction (MMAP), block prediction (BP), or midpoint prediction (MPP) without signaling the selection in the bitstream. In the decoder, similarly to the encoder, each sample may be predicted using a selected predictor. A residual value obtained from decoding the bitstream may be inverse quantized and the result added to the prediction forming the reconstructed sample value.

Modified median adaptive prediction (MMAP) predicts a current sample value as a function of previously coded samples to the left and above the current sample, as well as residuals from the entropy decoder. The previously coded samples used by modified median adaptive prediction (MMAP) are outside a current group. The encoder and decoder may use identical sets of reconstructed samples for this purpose, and hence modified median adaptive prediction (MMAP) may produce same results in both encoders and decoders.

Figure 5B:
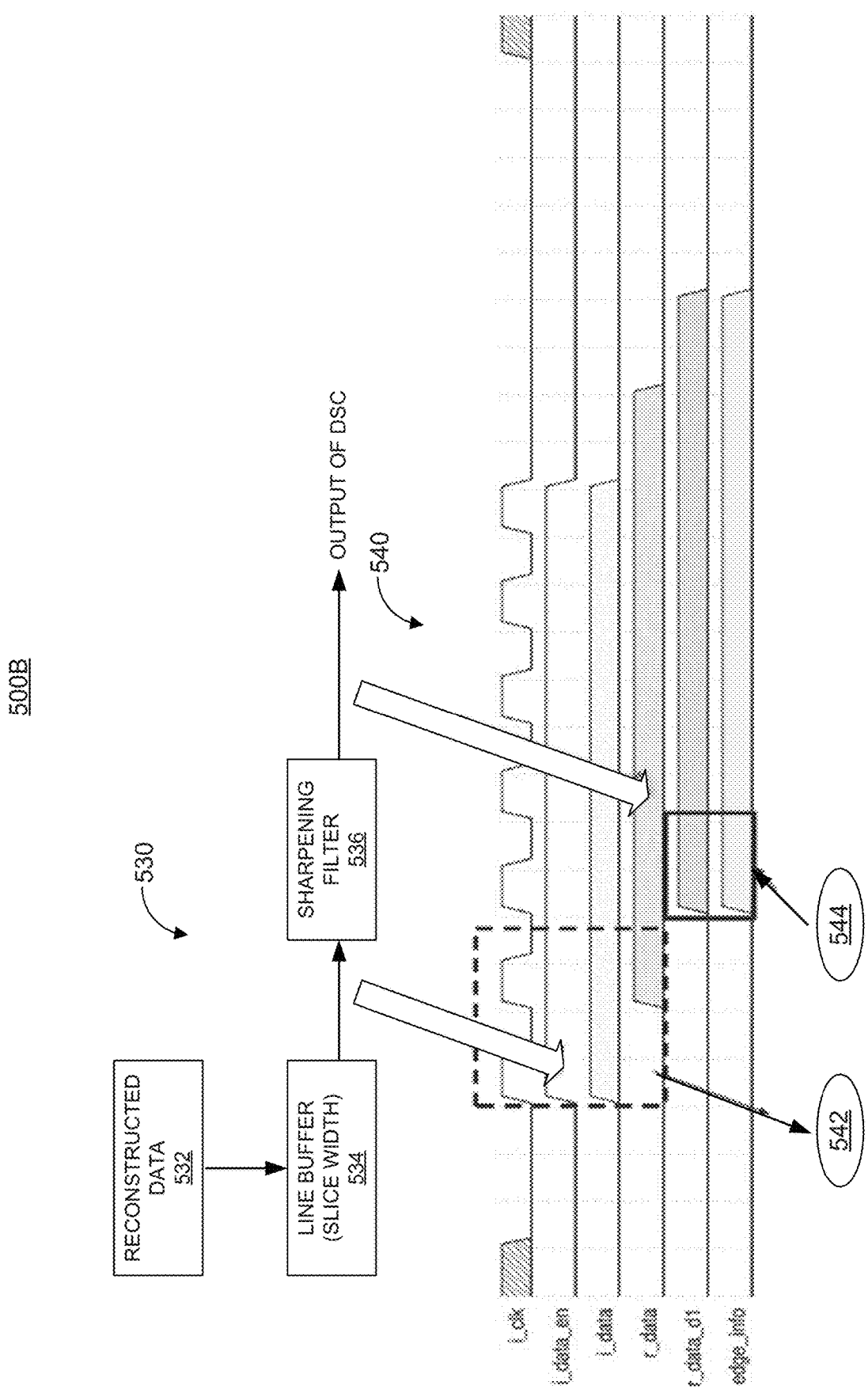
FIG. 5B illustrates a timing diagram for a data flow with a sharpening filter in a display stream compression (DSC), according to an example.

FIG. 5B illustrates a timing diagram for a data flow with a sharpening filter in a display stream compression (DSC) decoder, according to an example. Diagram 500B shows data flow 530 with reconstructed data 532 (current line) being pulled into a line buffer 534 (a slice width) and then into a sharpening filter 536, which provides an output of the display stream compression (DSC) decoder. In timing diagram 540, decoder signals and their timing are shown, specifically, how blurred data is obtained (542) from the current line and edge information is extracted from a difference between the blurred data and original data from the output of the display stream compression (DSC) decoder.

In a display stream compression (DSC) decoder, a median filter may be used with a resulting image having blurry lines. In some examples, a sharpening filter may create an unsharp mask based on a difference between the original signal (raw image) and the blurred signal from the median filter extracting edges. The sharpening filter may then generate a sharpened signal by applying the unsharp mask to the original signal boosting the detail of the original image (edges). As the current line is used for sharpening the image, no additional memories may be needed, the line memory in the display stream compression (DSC) decoder may be used. There may be 2 or 3 clock cycle delays to cover the computations for the sharpening operation as can be seen in the timing diagram 540.

Figure 5C:
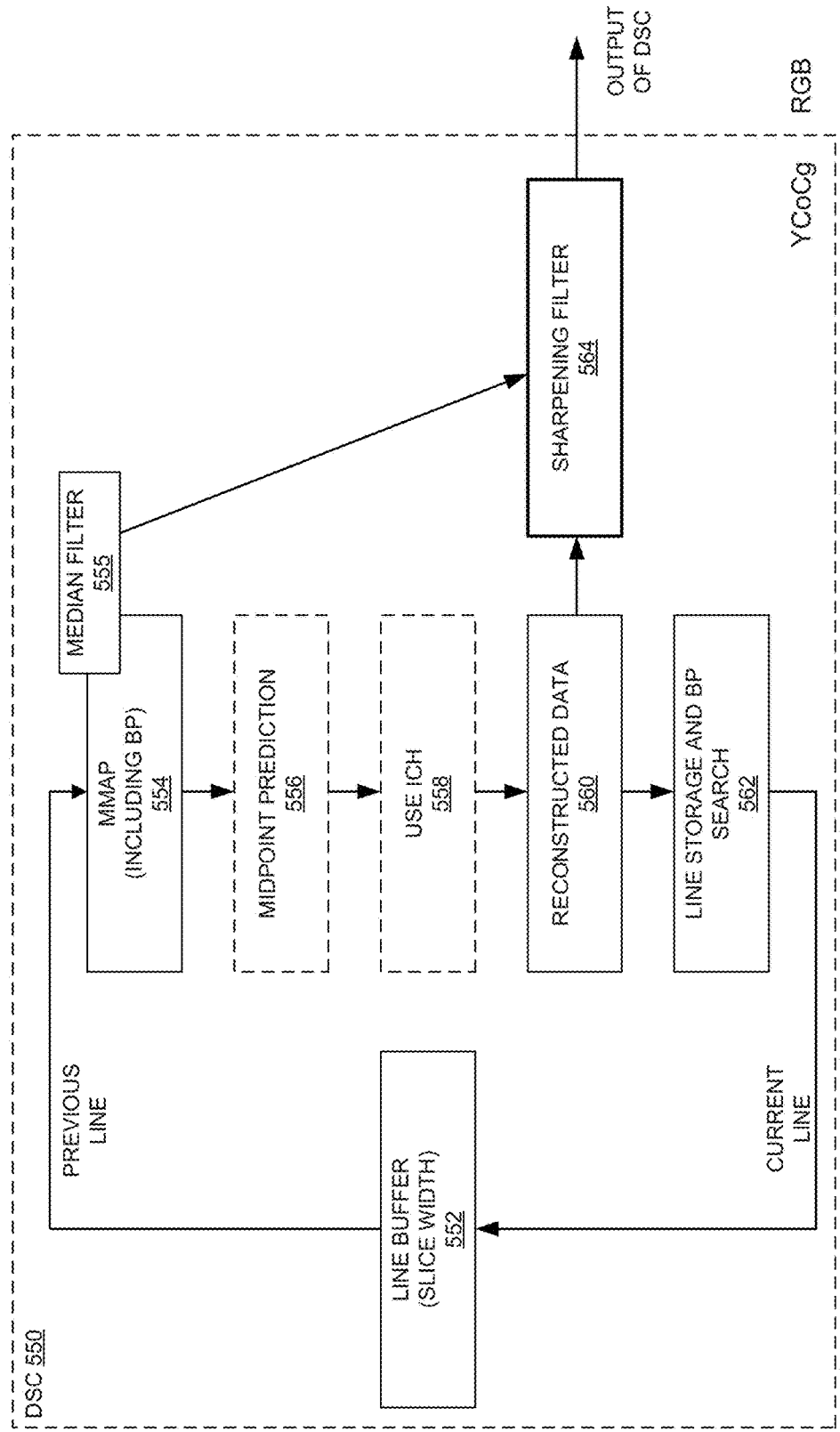
FIG. 5C illustrates a data flow diagram of a display stream compression (DSC) with a sharpening filter, according to an example.

FIG. 5C illustrates a data flow diagram of a display stream compression (DSC) with a sharpening filter, according to an example. Diagram 500C shows data flow in a display stream compression (DSC) decoder 550, where a current line of data may be provided to a line buffer 552, which covers a slice width and the previous line of data may be subjected to modified median adaptive prediction (MMAP) 554 including block prediction at the median filter 555. Following the modified median adaptive prediction (MMAP) 554, optionally midpoint prediction 556 and index color history (ICH) application 558 may be performed if applicable. Reconstructed data 560 may be provided for line storage and block prediction search 562 in the iterative process. The reconstructed data 560 may also be provided to a sharpening filter 564 along with original data (raw image) from the median filter 555. The sharpening filter 564 may provide an output of the display stream compression (DSC) decoder 550. While the image data within the display stream compression (DSC) decoder 550 may be in YCoCg format, it may be converted by a color space converter to red-green-blue (RGB) in the display driving integrated circuit (DDIC).

In some examples, the same filter may be used to generate blurred data and sharpened data. The sharpening filter 564 may generate a sharpened signal by applying the unsharp mask to the original signal boosting the detail of the original image (edges). As a single line of data is used for sharpening the image, no additional memories may be needed, the line memory (line buffer 552) in the display stream compression (DSC) decoder 550 may be used.

Figure 6:
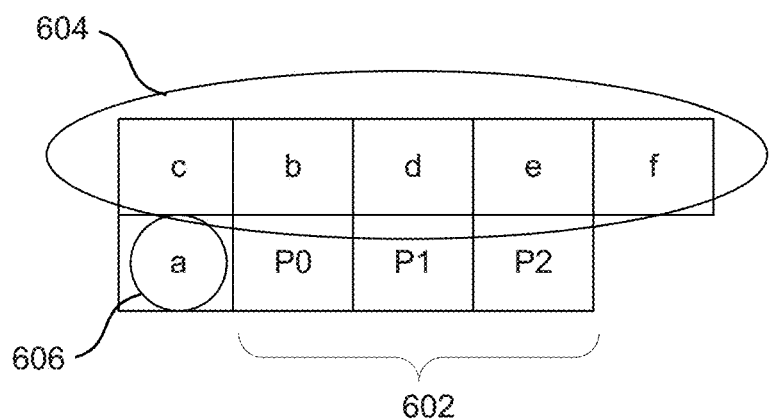
FIG. 6 illustrates pixels surrounding a current group and a line-based filtering to the pixels in modified median adaptive prediction, according to an example.

FIG. 6 illustrates pixels surrounding a current group and a line-based filtering to the pixels in modified median adaptive prediction, according to an example. Diagram 600 shows group of pixels 602 being predicted (P0, P1, P2), pixels 604 surrounding P0. P1. P2 from previous line, and reconstructed pixel 606 immediately to the left of P0. P1, P2. A quantization parameter (QP) filter applied to the reference pixels from the previous line may include a horizontal low pass filter to produce filtered pixels such as filtB 610. Diagram 600 includes an example filtB 610m where the filtering is filtB=(c+2*b+d+2)>>2.

As shown in the diagram, the three pixels within the group that are being predicted are P0, P1, and P2. Pixels c, b, d, e, and f are from the previous line, and pixel a is the reconstructed pixel immediately to the left. Horizontal low pass filters may be applied to the previous line to produce filtered pixels filtC, filtB, filtD, and filtE with an example for filtB provided above. If one of the pixel inputs to the filter is outside the slice, pixel replication may be used to fill those inputs. For example, filtB references pixel c, which is to the left of the slice boundary for the first group of a line. In this example, the pixel c value is the same as the pixel b value. Similarly, pixel replication may be used on the right side of the slice as well.

In some examples, a sharpening filter to enhance image quality may be implemented reusing filtered data of the modified median adaptive prediction (MMAP) without additional memory. The modified median adaptive prediction (MMAP) already uses low pass filter like median filter to make reconstructed pixels. Edge points of line data may be identified using prediction data (actual data) and filtered data. The points with the largest difference between actual and filtered data may represent edge of line data. Following is a table with representative example data with edge data based on difference between actual data and filtered data highlighted.

TABLE 1

Example actual and filtered data with edge
point determination based on difference.

| Actual data   | 20  | 60 | 128 | 60 | 20    |
|---------------|-----|----|-----|----|-------|
| Filtered data | 30  | 67 | 94  | 67 | 42.5  |
| Difference    | −10 | −7 | 34  | −7 | −22.5 |

If the absolute value of the difference between the actual and filtered data is above a particular threshold, weights may be added to the difference to sharpen the image. For example, if the difference is over 20, a weight of 10 may be added; if the difference is over 20, a weight of 10 may be added; if the difference is over 40, a weight of 20 may be added; if the difference is over 100, a weight of 30 may be added; if the difference is over 120, a weight of 40 may be added. The weight values may be stored as parameters nonvolatile memory, internal or external, to the display driving integrated circuit (DDIC) along with other parameters that may be needed for driving display panels, timing, algorithm settings, etc. In practical implementations, if the difference is greater than zero the weight may be added, otherwise, the weight may be subtracted. Thus, by enhancing the edge data, image may be sharpened, but not all data may need to be enhanced reducing overall computational complexity and need for memory. Following is another example table showing the data values of Table 1 with weights added.

TABLE 2

Example actual and filtered data with edge point determination
based on difference and weights added.

| Actual data   | 20  | 60 | 128 | 60 | 20    |
|---------------|-----|----|-----|----|-------|
| Filtered data | 30  | 67 | 94  | 67 | 42.5  |
| Difference    | −10 | −7 | 34  | −7 | −22.5 |
| After weight  | 20  | 60 | 138 | 60 | 10    |

Figure 7:
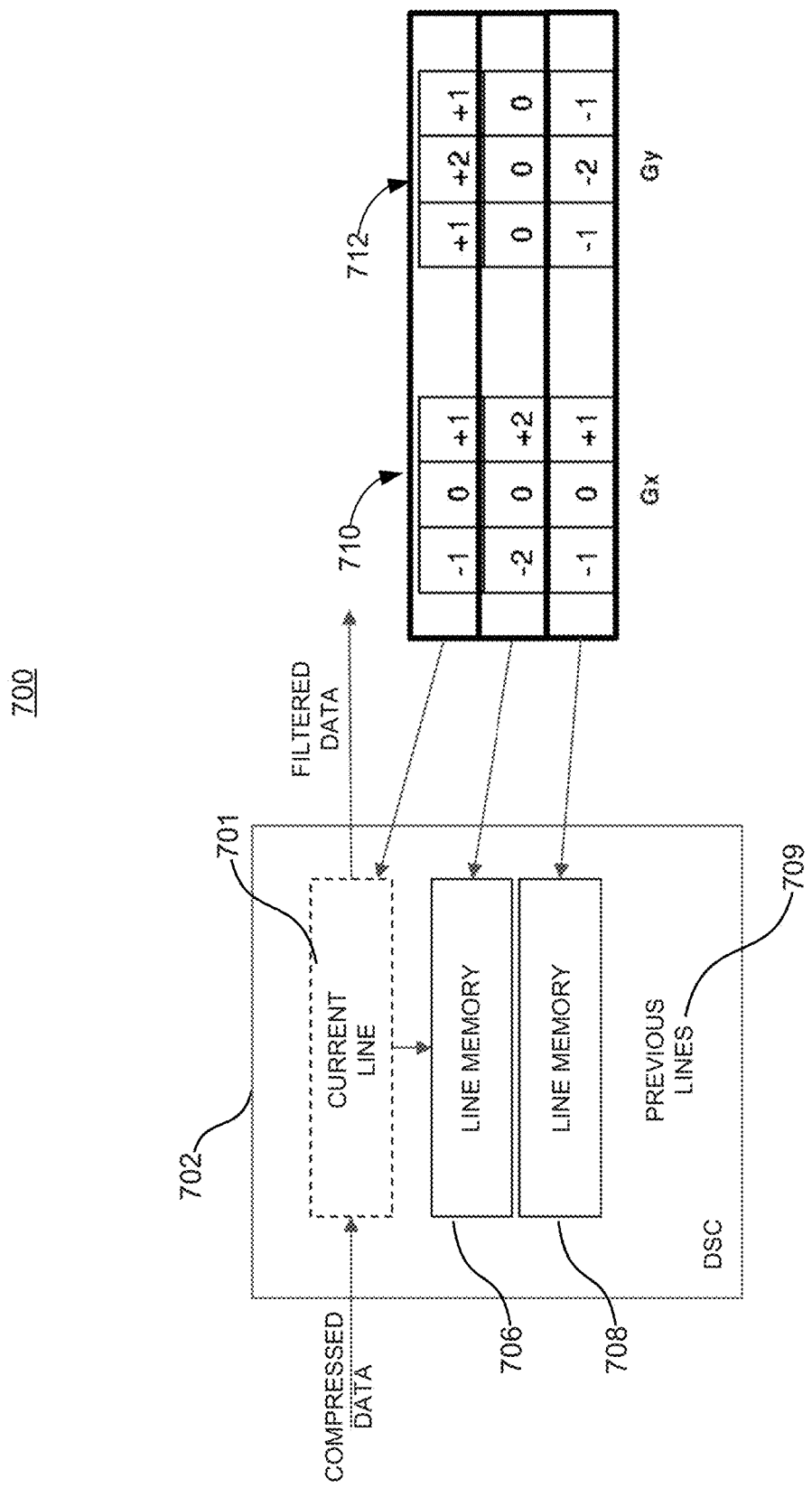
FIG. 7 illustrates a Sobel filter implementation with additional lines in display stream compression (DSC) decoding process, according to an example.

FIG. 7 illustrates a Sobel filter implementation with additional lines in display stream compression (DSC) decoding process, according to an example. Diagram 700 shows a Sobel filter operation in display stream compression (DSC) decoder 702 with compressed data entering the display stream compression (DSC) decoder and filtered data exiting. A current line (reconstructed data) 701 is pushed down into line memory 706 as previous line when a new current line is loaded. In some examples, an additional line memory 708 may be used for the filter operation avoiding a need for additional memory within the display driving integrated circuit (DDIC). As each line of compressed data is processed (filtered), previous lines 709 may be pushed out of the line memories 706, 708. x-direction Sobel kernel 710 and y-direction Sobel kernel 712 are also shown in the diagram.

The Sobel filter, also called the Sobel-Feldman operator, is used in edge detection to emphasize edges in an image (sharpen the image). Sobel filter is a discrete differentiation operator, computing an approximation of the gradient of the image intensity function. For each point in the image, the Sobel filter provides either a corresponding gradient vector or a norm of the vector. The operation convolves the image with a small, separable, and integer-valued filter in horizontal (x-direction) and vertical (y-direction) directions. Sobel filter uses two 3×3 Sobel kernels, which are convolved with the original image to compute approximations of the derivatives, one for horizontal changes, and one for vertical. Gx (x-direction Sobel kernel) 710 and Gy (y-direction Sobel kernel) 712 are two images which at each point contain the horizontal and vertical derivative approximations, respectively.

In some examples, the additional line memory 708 may be implemented in the display stream compression (DSC) decoder 702 to allow the 3×3 convolution operation to be performed (including the current line 704 and the line memory 706). Thus, with one line memory addition to the display stream compression (DSC) decoder 702, edge enhancing (sharpening) filter may be implemented on the decoding side.

Figure 8:
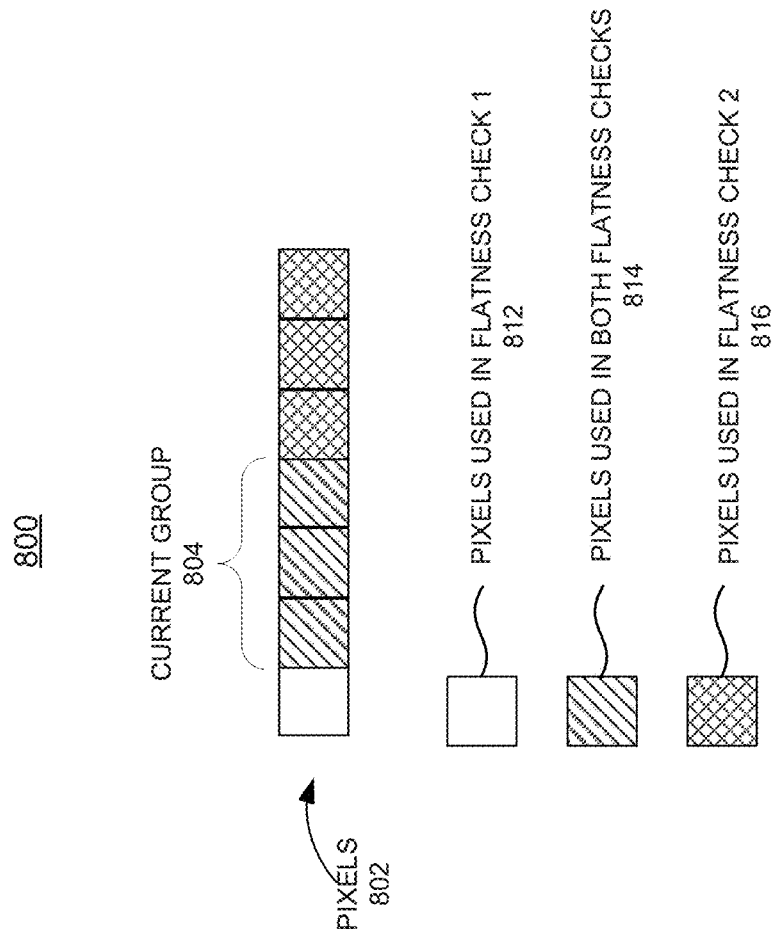
FIG. 8 illustrates pixels used for flatness check, according to an example.

FIG. 8 illustrates pixels used for flatness check, according to an example. Diagram 800 shows a current group 804 (being processed) of pixels in a line of pixels 802, where pixels used in a first flatness check (812), pixels used in a second flatness check (816), and pixels used in both flatness checks (814) are indicated by fill patterns of each pixel.

The display stream compression (DSC) has flatness check function. Flatness is a measure of smoothness or similarity in pixel values throughout a region in the picture. Flatness may be used by the rate controller to adjust the quantization parameter (QP) allowing the quantization to introduce more or less error depending on the flatness. Two levels of flatness indicators may be used: 1) very flat and 2) somewhat flat. The flatter a region, the less errors that may be tolerated (the errors are far more noticeable than "busy" areas of the image). Flatness determination may use a super group, which is four consecutive groups of three pixels each. The indication of flatness may occur every four groups and may be transmitted using a code sequence in the first luma substream in the super group. The original uncompressed pixels may be used in the flatness determination.

In some implementations, the encoder may drop the quantization parameter (QP) if the upcoming pixels are relatively flat. A first super group of each slice may start at the second group within the slice. Before encoding each super group after the first group within the slice, the encoder may perform a flatness check on each group to determine whether any within that super group are flat.

If flatness flag changes from high to low or from low to high for a pixel, that point may have a higher likelihood of being an edge point. Thus, a flatness change information may be used to identify or confirm edge points and add or subtract weights. The flatness check may also be used in combination with the sharpening filter or Sobel filter examples described herein to increase an accuracy and reduce an error of those filters.

Figure 9A:
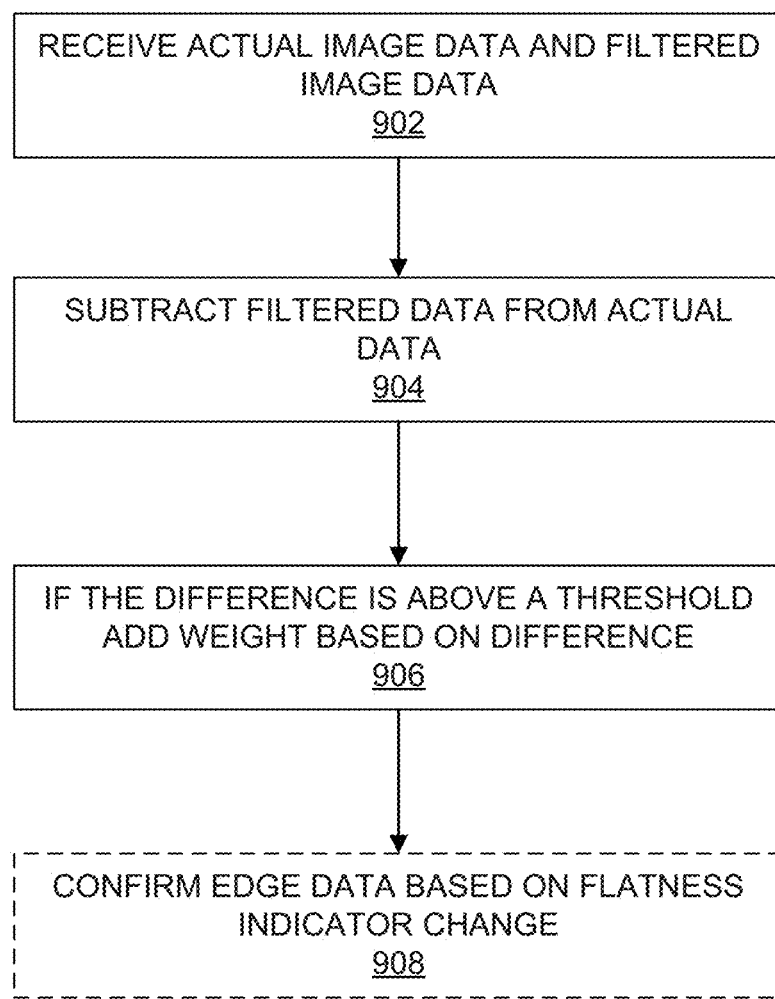
FIGS. 9A-9B illustrate methods for employing display stream compression (DSC) in a display driving integrated circuit (DDIC), according to an example.
Figure 9B:
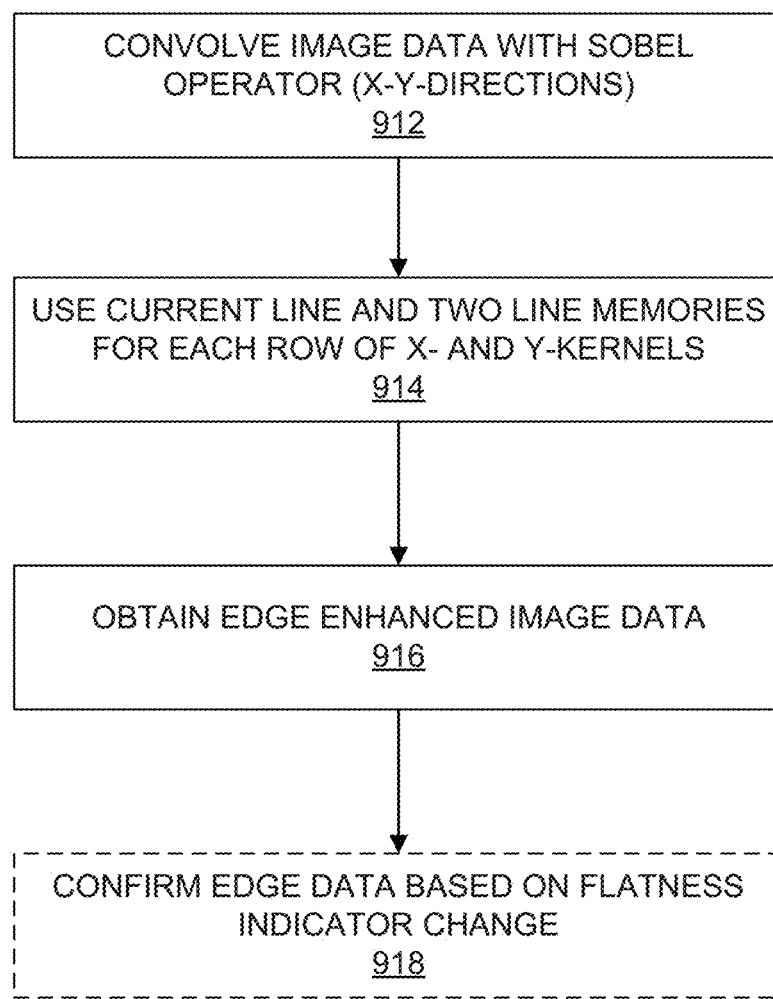

FIGS. 9A-9B illustrate methods for employing display stream compression (DSC) in a display driving integrated circuit (DDIC), according to examples. The method 900A in FIG. 9A and the method 900B in FIG. 9B are provided by way of example, as there may be a variety of ways to carry out the methods described herein. Although the methods 900A and 900B are primarily described as being performed by the components of FIGS. 5 and 7, the methods 900A and 900B may be executed or otherwise performed by one or more processing components of another system or a combination of systems. Each block shown in FIGS. 9A and 9B may further represent one or more processes, methods, or subroutines, and one or more of the blocks (e.g., the selection process) may include machine readable instructions stored on a non-transitory computer readable medium and executed by a processor or other type of processing circuit to perform one or more operations described herein At block 902 of the method 900A, actual (uncompressed) image data and filtered image data (low pass filtered at a line of display stream compression "DSC") for each pixel of an image being decoded may be received at prediction stage of the decoding operations. The filtered image data for each pixel may be subtracted from the actual image data for each pixel to determine a difference between the actual image data and the filtered image data at block 904.

At block 906, the difference between the actual image data and the filtered image data for each pixel may be compared to a predetermined threshold. If the difference is above the threshold, the pixel may be identified as edge pixel (thus, data as edge data) and a predetermined weight value may be added to the actual data to enhance the edge data and thereby make the image sharper (enhanced edges provide sharpness).

At optional block 908, a flatness indicator of the display stream compression (DSC) may be used to confirm that the determined edge data is actually edge data. If flatness flag changes from high to low or from low to high for a pixel, that point may have a higher likelihood of being an edge point. In other examples, the flatness indicator based edge data identification may be used by itself and weights added or subtracted based on the flatness indicator change.

At blocks 912 and 914 of the method 900B, the actual image data may be subjected to a Sobel filter operator by convolving with the x- and y-direction Sobel kernels, which are 3×3 matrices. The convolution operation may be performed in a current line 704, a line memory 706, and an additional line memory 708 of the display stream compression (DSC) decoder. An edge enhanced image may be obtained at block 916 as a result of the Sobel filter operation on each pixel. Thus, by adding one line memory to the display stream compression (DSC) decoder, image sharpening may be achieved without further image processing or additional memories in the display driving integrated circuit (DDIC).

As in the method 900A, a flatness indicator of the display stream compression (DSC) may be used to confirm that the determined edge data is actually edge data at optional block 918 of the method 900B. If flatness flag changes from high to low or from low to high for a pixel, that point may have a higher likelihood of being an edge point. In other examples, the flatness indicator based edge data identification may be used by itself and weights added or subtracted based on the flatness indicator change.

According to examples, a method of making a display driving integrated circuit (DDIC) employing display stream compression (DSC) for image enhancement is described herein. A system of making the display driving integrated circuit (DDIC) is also described herein. A non-transitory computer-readable storage medium may have an executable stored thereon, which when executed instructs a processor to perform the methods described herein.

Various circuits, devices, and systems are described herein using example components, configurations, and characteristics. The discussed components, configurations, and characteristics are not intended to be restrictive of example circuits, devices, and systems. Examples may be implemented with different components, configurations, and characteristics using the principles described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

The invention claimed is:

1. A display system, comprising:
   a display panel; and
   a display stream compression (DSC) decoder to:
      receive actual image data for each pixel of an image to be displayed on the display panel;
      filter the actual image data to obtain filtered image data for each pixel;
      determine a difference between the actual image data and the filtered image data for each pixel; and
      if an absolute value of the difference between the actual image data and the filtered image data for each pixel is above a threshold, add a weight value to the actual image data of the pixel if the actual image data is greater than the filtered image data, or subtract the weight value from the actual image data of the pixel if the actual image data is less than the filtered image data.

2. The display system of claim 1, wherein the weight value varies and is selected based on the absolute value of the difference between the actual image data and the filtered image data, wherein if the absolute value of the difference is greater than a first threshold, a first weight value is selected, and if the absolute value of the difference is greater than a second threshold higher than the first threshold, a second weight value higher than the first weight value is selected.

3. The display system of claim 1, wherein the display stream compression (DSC) decoder comprises:
   a prediction, inverse quantization, and reconstruction block to perform prediction, inverse quantization, and reconstruction of image pixels; and
   a line buffer to store the reconstructed image pixels.

4. The display system of claim 3, wherein the difference between the actual image data and the filtered image data for each pixel is determined and the weight value added or subtracted at the prediction, inverse quantization, and reconstruction block.

5. The display system of claim 1, wherein the display stream compression (DSC) decoder employs prediction mode and modified median-adaptive prediction (MMAP) to reconstruct image pixels.

6. The display system of claim 5, wherein the filtered image data is obtained through a quantization parameter adaptive filter of the modified median-adaptive prediction (MMAP).

7. The display system of claim 1, wherein the display panel is a liquid crystal display (LCD) panel, an organic light emitting diode (OLED) display panel, a microLED display panel, a liquid-crystal on silicon (LCOS) display panel, or a digital driving control-based display panel.

8. The display system of claim 1, wherein the display stream compression (DSC) decoder is further to:
   confirm an edge pixel based on a flatness indicator change from high to low or low to high for the edge pixel.

9. A display system, comprising:
   a display panel; and
   a display driving integrated circuit (DDIC) comprising:
      a display stream compression (DSC) decoder to:
         receive actual image data for each pixel;
         apply a low-pass filter operation to the actual image data of each pixel to obtain filtered image data for each pixel;
         determine a difference between the actual image data and the filtered image data for each pixel; and
         if an absolute value of the difference between the actual image data and the filtered image data for each pixel is above a threshold, add a weight value to the actual image data of the pixel if the actual image data is greater than the filtered image data, or subtract the weight value from the actual image data of the pixel if the actual image data is less than the filtered image data.

10. The display system of claim 9, wherein the display stream compression (DSC) decoder comprises:
    a prediction, inverse quantization, and reconstruction block to perform prediction, inverse quantization, and reconstruction of image pixels; and
    a line buffer comprising two line memories to store the reconstructed image pixels.

11. The display system of claim 10, further comprising: apply a Sobel filter operation to the actual image data of each pixel by convolving the actual image data with x- and y-direction Sobel kernels, wherein a current line, a line memory, and an additional line memory of the display stream compression (DSC) decoder are used for the convolution with each row of the x- and y-direction Sobel kernels, and
    wherein the Sobel filter operation is performed at the prediction, inverse quantization, and reconstruction block and the line buffer is used as the additional line memory for the convolution of the actual image data with each row of the x- and y-direction Sobel kernels.

12. The display system of claim 9, wherein the display stream compression (DSC) decoder employs prediction mode and modified median-adaptive prediction (MMAP) to reconstruct image pixels.

13. The display system of claim 9, wherein the display stream compression (DSC) decoder is further to apply a Roberts filter operation or a Prewitt filter operation.

14. The display system of claim 9, wherein the display stream compression (DSC) decoder is further to:
    confirm an edge pixel based on a flatness indicator change from high to low or low to high for the edge pixel.

15. A method to enhance image sharpness in a display system, the method comprising:
    receiving actual image data for each pixel of an image at a display stream compression (DSC) decoder of a display driving integrated circuit (DDIC), wherein the image is to be reconstructed and displayed on a display panel;
    performing a low-pass filter operation on the actual image data at the display stream compression (DSC) decoder to obtain filtered image data for each pixel;
    determining a difference between the actual image data and the filtered image data for each pixel; and
    if an absolute value of the difference between the actual image data and the filtered image data for each pixel is above a threshold, adding a weight value to the actual image data of the pixel if the actual image data is greater than the filtered image data, or subtracting the weight value from the actual image data of the pixel if the actual image data is less than the filtered image data.

16. The method of claim 15, wherein adding or subtracting the weight value to or from the actual image data is part of an edge enhanced image data operation, and
    wherein the method further comprises:
       performing a color space conversion on edge enhanced image data; and
       providing color space converted image data to the display panel to be displayed.

17. The method of claim 15, further comprising:
    selecting the weight value based on the absolute value of the difference between the actual image data and the filtered image data, including:
       if the absolute value of the difference is greater than a first threshold, selecting a first weight value, and
       if the absolute value of the difference is greater than a second threshold higher than the first threshold, selecting a second weight value higher than the first weight value.

18. The method of claim 15, further comprising:
    confirming an edge pixel based on a flatness indicator change from high to low or low to high for the edge pixel.

19. The method of claim 15, further comprising:
    performing an edge enhancing high pass filter operation on the actual image data, wherein performing the edge enhancing high pass filter operation comprises:

convolving the actual image data for each pixel with x- and y-direction Sobel kernels using a current line, a line memory, and an additional line memory of the display stream compression (DSC) decoder; and obtaining edge enhanced image data for each pixel from the convolution.

20. The method of claim 15, further comprising:

employing prediction mode and modified median-adaptive prediction (MMAP) at the display stream compression (DSC) decoder.

* * * * *